United States Patent [19]

Käsmeier et al.

[11] Patent Number: 5,660,400
[45] Date of Patent: Aug. 26, 1997

[54] CHUCK AND ASSOCIATED TOOL

[75] Inventors: Georg Käsmeier, Gundihausen; Klaus Mintert, Seukendorf, both of Germany

[73] Assignee: Widia GmbH, Essen, Germany

[21] Appl. No.: 596,350

[22] PCT Filed: Aug. 6, 1994

[86] PCT No.: PCT/DE94/00911

§ 371 Date: Feb. 14, 1996

§ 102(e) Date: Feb. 14, 1996

[87] PCT Pub. No.: WO95/05257

PCT Pub. Date: Feb. 23, 1995

[30] Foreign Application Priority Data

Aug. 18, 1993 [DE] Germany ............... 43 27 698.9

[51] Int. Cl.⁶ .................................................. B23B 31/07
[52] U.S. Cl. ..................... 279/83; 279/105.1; 408/226
[58] Field of Search ..................... 279/83, 105.1; 408/226

[56] References Cited

U.S. PATENT DOCUMENTS 2,529,396 11/1950 Hunt ........................ 279/105.1

FOREIGN PATENT DOCUMENTS

| 2 134 202 | 12/1972 | France . |
| 2 141 637 | 2/1973 | Germany . |
| WO 93/08946 | 5/1993 | WIPO . |

*Primary Examiner*—Steven C. Bishop
*Attorney, Agent, or Firm*—Herbert Dubno

[57] ABSTRACT

A chuck and tool assembly in which the tool is formed with a continuous axially extending flat surface along its elongated shank and has axially spaced depressions which narrow away from that surface. The holder body has an axial bore receiving the shank and a pair of screws spaced apart axially so that when one of the screws engages in one of the depressions, the other screw bears upon a flat surface between two depressions to lock the tool in the holder body.

5 Claims, 1 Drawing Sheet

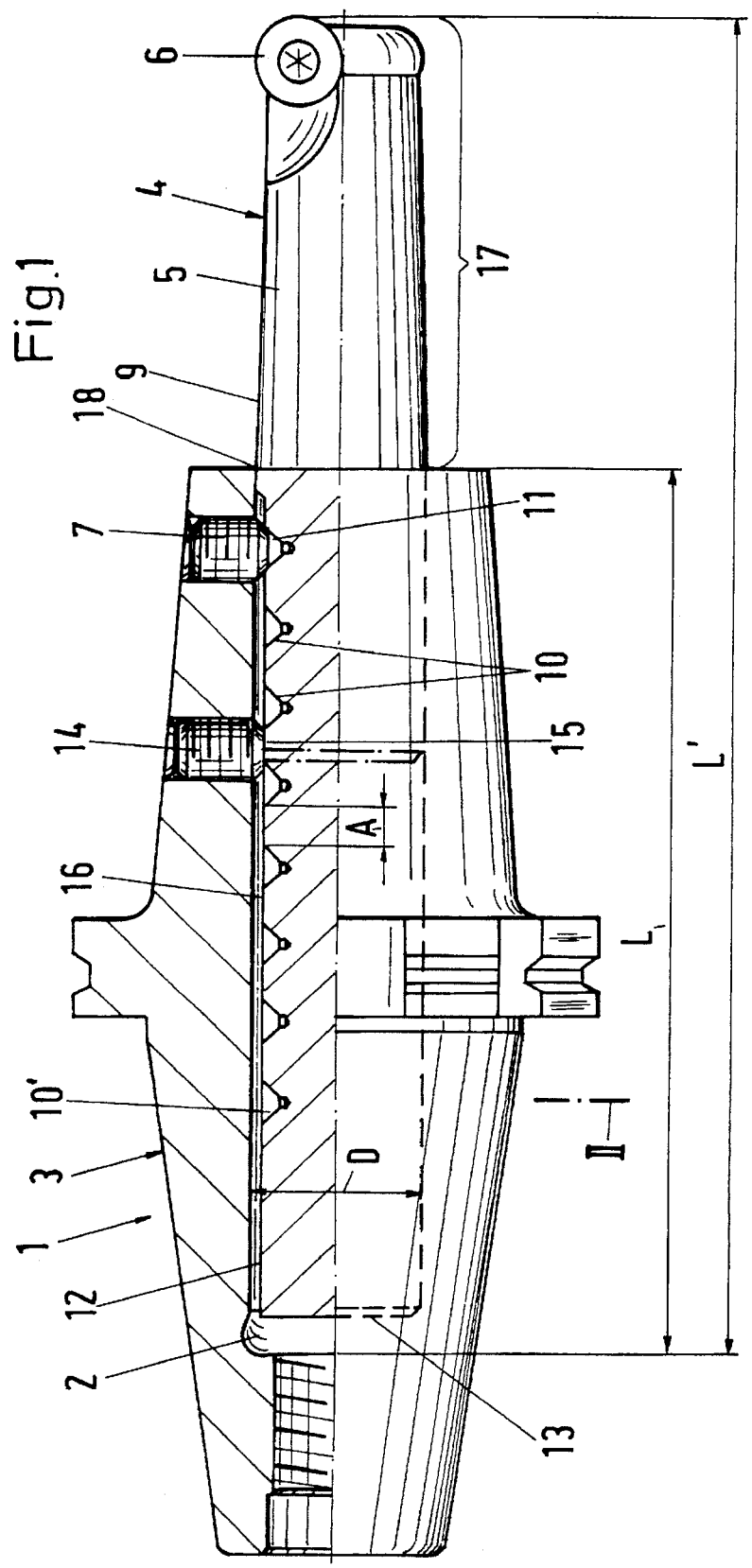
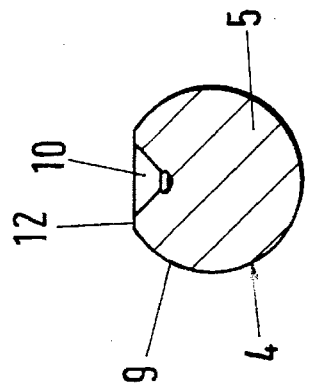
Fig.1
Fig.2

CHUCK AND ASSOCIATED TOOL

CROSS REFERENCE TO RELATED APPLICATIONS

This application is a national phase of PCT/DE94/00911 filed Aug. 6, 1994 and based, in turn, upon German national application P43 27 698 under the International Convention.

FIELD OF THE INVENTION

Specification

The invention relates to a chuck and an associated tool wherein the chuck has a main tool holder body with a receiving bore and the tool has a shank received in that bore and held therein in at least one transversely movable fastening element which engages the tool at the circumference of its shank.

BACKGROUND OF THE INVENTION

Due to their general use, chucks or couplings can have a main body with a receiving bore for a tool provided with a shank, whereby further in the main body at least one transversely movable fastening element is arranged for fastening the tool by engagement with the periphery of its shank. Such shank tools held by by chucks are used, for instance, in drop forging, when impressions have to be created in plate-shaped workpieces. In order to achieve a high chip removal rate it is necessary for the chuck to hold the tool securely and free of vibrations. This is also achieved by adjusting the projection length to the respective operation, which requires a large variety of tools due to the differently stepped shank lengths.

Furthermore from U.S. Pat. No. 5,080,536 a chuck for an adjustable shank tool is known. Several locking screws as well as a slotted clamping sleeve serve for fastening the shank tool in the tubular coupling part or chuck. The clamping sleeve surrounds the shank tool and supports it inside the tubular coupling part. The locking screws engage partially on the outside of the clamping sleeve and partially reach through a slot in the clamping sleeve, engaging directly the shank of the tool. A precisely defined adjustment of the shank tool is not possible and expenses and tolerances are high due to the clamping sleeve.

A further chuck is known from DE 21 41 637 A1 and assumes that the shank of the tool is provided with a flat threading and with flat surface extending over the entire shank length. The main body of the chuck is sleeve-like and has a blind bore, wherein two peripherally originating locking screws engage and press against the flat shank surface for fastening purposes. A nut is arranged in front of the blind bore and makes it possible to adjust the shank position in relation to the chuck in accordance with the pitch of the thread.

OBJECT OF THE INVENTION

It is the object of the invention to improve a tool of the type described to make it adjustable in a simple manner without complications and enable the user to make do with fewer tools in comparable work processes.

SUMMARY OF THE INVENTION

In order to solve this problem the invention provides that the shank of the tool be provided with several acting and holding surfaces arranged at an axial distance from each other and assigned to the fastening element.

By arranging several acting and holding surfaces at an axial distance from each other it is possible to arrange the tool in the chuck with an exact fit and to fasten it with specified defined variable projection lengths. In this way the user is in a position to use one and the same tool optimally, as well as to use it for different work situations. After releasing the fastening element or elements, he can always adjust the tool directly in the chuck and secure it again in a different work position. The tool can be adjusted to a multitude of various work positions corresponding to the number of the acting and holding surfaces arranged on the shank of the tool, whereby the fastening element in the form of a locking screw performs the function of a centering screw and of a clamping screw.

According to a preferred embodiment example two fastening elements in the form of screws are provided, whereby the one fastening element has primarily the function of a centering and clamping screw and the other fastening element having a flat surface acts primarily as a tightening and check screw. The acting and holding surfaces can be narrowing depressions and one of at least two fastening elements can have an end shaped like a frustum of a cone engaging in one such depression. The other fastening element has a flat end engageable with a surface between depressions which are arranged at an axial distance A from one another which is equal to the effective width of the free end of the fastening element with the flat end. The fastening elements can be respective screws and the length of the bore and of the shank can be large relative to the diameter of the bore. The length L of the receiving bore can thus be five to six times greater than the diameter D.

BRIEF DESCRIPTION OF THE DRAWING

The above and other objects, features, and advantages will become more readily apparent from the following description reference being made to the accompanying drawing in which:

FIG. 1 is a partially sectional side view of a chuck with inserted tool; and

FIG. 2 is a transverse section through the tool in plane II of FIG. 1.

SPECIFIC DESCRIPTION

FIG. 1 shows chuck 1 having a main body 3 with a receiving bore 2 which serves for receiving a tool 4, such as a milling end cutter, which consists of a shank 5 and for instance of one or more cutting plates 6. Further in the main body 3 of chuck 1 at least one transversely movable fastening element 7 is arranged and for fastening the tool 4, it engages the circumference 9 of its shank 5.

According to the embodiment example further several acting and holding surfaces 10 are arranged in one axial plane and at axial distance from each other on the shank 5 of the tool 4 and cooperate independently of each other with the fastening element 7.

The acting and holding surfaces 10 assigned to the fastening element 7 are narrowing depressions, as can be seen from FIGS. 1 and 2. These acting and holding surfaces can be conical, shaped like the frustum of a cone, or also spherical, or can have the shape of a groove extending in circumferential direction.

Corresponding to the shape and the configuration of the acting and holding surfaces 10, the fastening element 7 can have a free, narrowing end 11, respectively shaped like a frustum of a cone. The fastening element 7, which serves for centering and fastening, interlocks positively with the narrowing despressions forming the acting and holding surfaces 10.

The acting and holding surfaces 10 are aligned in one line and are located in a preferably flat surface 12 extending in axial direction at the periphery 9 of the shank 5. This surface 12 extends from the chuck-side end 13 of the shank 5 over the most of its length. As can be seen from FIG. 1, eight acting and holding surfaces 10 are provided in the form of narrowing depressions in the flat surface 12 at the periphery 9 of shank 5.

Basically, it is sufficient to have one fastening element 7 for numerous cases of use. However, according to the embodiment example, in the main body 3 of the chuck 1 there is a further fastening element 14 for the tool 4. This fastening element 14 has a flat end 15 engaging against the flat surface 12 of the tool 4.

At least one, preferably both fastening elements 7 and 14 are screws, whereby the first screw-shaped fastening element 7 serves primarily for setting the position of the tool and also for fastening, and the other screw-shaped fastening element 14 serves primarily for fastening the tool 4 and also for checking it.

The acting and holding surfaces 10, respectively the conical depressions are arranged at an axial distance A from each other, which is equal to the effective width of the flat surface at the free end 15 of the second screw-shaped fastening element 14. Furthermore the two screw-shaped fastening element 7, 14 are arranged in the main body 3 in such a manner that the fastening element 7 engages in positive interlocking in the acting and holding surface 10 or conical depression, while to the free end 15 of the other screw-shaped fastening element 14 respectively a flat intermediate surface or catching surface 16 is assigned, which is located between two neighboring acting and holding surfaces 10 which are shaped like frustums of cones or countersinkings.

Finally FIG. 1 shows that the receiving bore 2 in the main body 3 and the shank 5 of the tool are of lengths L, and L', greater than the diameter D. It is suitable for the length L of the receiving bore 2 to be five to six times greater than the diameter D.

The length of the shortest possible end piece 17 of the tool 4 freely projecting from the chuck 1, or the coupling element, equals approximately one third of the total length L' of the shank 5. The length of the largest freely projecting end piece is approximately twice or 2.5 times as long as the length of the shortest possible end piece 17.

The last acting and holding surface 10' located in the receiving bore 2 is arranged at a distance from the free end 13 of the shank 5. This distance further corresponds to the distance between two screw-shaped fastening elements 7 and 14, which again are arranged close to the opening 18 of the receiving bore 2. The distance of the screw-shaped fastening element 14 from the screw-shaped fastening element 7 is finally selected so that two free acting and holding surfaces 10 and additionally two catching surfaces 16 are located between them.

We claim:

1. A chuck and tool assembly comprising:

a tool having an elongated shank formed on a periphery thereof with a continuous axially extending flat surface, and with a multiplicity of depressions opening at said surface and spaced apart by respective flat regions of said surface;

a tool holder body having a bore receiving said shank; and two fastening elements mounted in said body for transverse movement and axially spaced apart at a spacing such that one of said fastening elements is engageable in one of said depressions while the other of said fastening elements has a free end engaging one of said flat regions between two of said depressions for locking said tool to said body.

2. The chuck and tool assembly defined in claim 1 wherein said fastening elements are screws and said other of said fastening elements is flat at said free end.

3. The chuck and tool assembly defined in claim 2 wherein said depressions narrow away from said surface and said one of said fastening elements has a tapering end engageable in said one of said depressions.

4. The chuck and tool assembly defined in claim 3 wherein said depressions are conical and said one of said fastening elements has a frustoconical end engageable in said one of said depressions.

5. The chuck and tool assembly defined in claim 2 wherein said depressions are spaced apart by axial distances A equal to a width of said free end of said other of said fastening elements.

* * * * *